United States Patent
Hsiung et al.

(10) Patent No.: US 8,111,526 B2
(45) Date of Patent: Feb. 7, 2012

(54) OPTICAL ENGINE FOR IMPROVING ELECTROMAGNETIC INTERFERENCE

(75) Inventors: Chien-Chih Hsiung, Taichung (TW); Keng-Hui Lin, Taichung (TW); Wen-Lang Hung, Taichung (TW); Wei-Hsiang Peng, Taichung (TW); Chao-Yang Ke, Taichung (TW); Yi-Chung Hung, Taichung (TW)

(73) Assignee: Asia Optical Co., Inc., Tepz, Taichung (TW)

( * ) Notice: Subject to any disclaimer, the term of this patent is extended or adjusted under 35 U.S.C. 154(b) by 742 days.

(21) Appl. No.: 12/211,363

(22) Filed: Sep. 16, 2008

(65) Prior Publication Data

US 2009/0109640 A1  Apr. 30, 2009

(30) Foreign Application Priority Data

Oct. 25, 2007  (TW) .............................. 96140056 A

(51) Int. Cl.
*H05K 7/00* (2006.01)

(52) U.S. Cl. ........ 361/816; 361/800; 361/818; 174/377; 174/387; 353/119; 353/122

(58) Field of Classification Search .................. 361/760, 361/816, 752, 753, 679.01, 800, 818; 174/520, 174/535, 255, 260, 377, 50, 539, 559, 564, 174/59, 350, 387; 353/119, 100, 122; 312/10.1; 352/243
See application file for complete search history.

(56) References Cited

U.S. PATENT DOCUMENTS

| | | | | |
|---|---|---|---|---|
| 599,406 A * | 2/1898 | McKain et al. | ............... | 293/105 |
| 4,763,225 A * | 8/1988 | Frenkel et al. | ................ | 361/709 |
| 4,831,498 A * | 5/1989 | Baba | .............................. | 361/816 |
| 6,350,033 B1 * | 2/2002 | Fujimori | ......................... | 353/61 |
| 6,477,039 B2 * | 11/2002 | Tajima | ..................... | 361/679.21 |
| 7,296,900 B2 * | 11/2007 | Fujimori | ....................... | 353/119 |
| 7,940,347 B2 * | 5/2011 | Ono et al. | ........................ | 349/58 |
| 2006/0152909 A1 * | 7/2006 | Nomoto et al. | ............... | 361/730 |

* cited by examiner

*Primary Examiner* — Angel R Estrada
*Assistant Examiner* — Dimary Lopez
(74) *Attorney, Agent, or Firm* — Thomas|Kayden

(57) ABSTRACT

An optical engine is provided, including an imaging module, a driver module and a connecting unit. The imaging module includes an imaging housing with an imaging space and an imaging unit installed in the imaging space. The imaging housing is made of a conductive material. The driver module includes a driver housing with a driver space and a driver circuit board installed in the driver space. The connecting unit includes at least one of the cables is electrically connected to the imaging unit and the driver circuit board and at least a protruding module protruding from the imaging housing (or the driver housing) to contact with the driver housing (or the imaging housing). The cable is installed in the protruding module made of a conductive material.

16 Claims, 5 Drawing Sheets

OPTICAL ENGINE FOR IMPROVING ELECTROMAGNETIC INTERFERENCE

CROSS REFERENCE TO RELATED APPLICATIONS

This Application claims priority of Taiwan Patent Application No. 096140056, filed on Oct. 25, 2007, the entirety of which is incorporated by reference herein.

BACKGROUND OF THE INVENTION

1. Field of the Invention

The invention relates to a projection system, and more particularly, to an optical engine for improving electromagnetic interference for a projection system.

2. Description of the Related Art

Common household or commercial projection systems are regulated and inspected for electromagnetic waves. Electromagnetic interference from projection systems affects other electronic devices and even interferes with operations thereof. Thus, electromagnetic interference is prevented by using projection systems passing electromagnetic wave inspections.

There are many electric components generating electromagnetic waves in a projection system. For an imaging unit generating images, for example an LCos (Liquid Crystal on Silicon) display, a cable transmits high frequency imaging signals from an independent driver module, thus, electromagnetic waves with high frequency are generated along the cable. If electromagnetic waves with high frequency are not decreased, an imaging unit will not pass electromagnetic wave safety inspections. A conventional solution is to cover a copper foil on the cable, and then stick an adhesive tape on the cable to electrically connect the cable to a metal housing. If inspection requirements are still not met, a metal sheet is further provided to cover the cable, thus decreasing leakage by sealing in the electromagnetic waves. However, to improve electromagnetic interference, the above-mentioned solution requires additional materials and increased assembly steps. Thus, increasing costs and time needed for repair and replacement.

BRIEF SUMMARY OF THE INVENTION

The invention provides an optical engine for improving electromagnetic interference.

The invention provides an optical engine comprising an imaging module, a driver module and a connecting unit. The imaging module comprises an imaging housing with an imaging space and an imaging unit installed in the imaging space. The imaging housing is made of a conductive material. The driver module comprises a driver housing with a driver space and a driver circuit board installed in the driver space. The connecting unit comprises at least one of the cables is electrically connected to the imaging unit and the driver circuit board and at least a protruding module protruding from the imaging housing (or the driver housing) to contact with the driver housing (or the imaging housing). The cable is installed in the protruding module made of a conductive material.

The efficacy of the invention is that the imaging house is electrically connected to the driver housing via the protruding module. Thus, the imaging module and the driver module form a close loop and conductive environment. Thus, shielding effect shields electromagnetic waves generated by the cable in the imaging space and the cable in the protruding module. At least one of the cables is electrically connected to the imaging unit and the driver circuit board for improving electromagnetic interference. The optical engine achieves the goal of the invention.

The invention can be more fully understood by reading the subsequent detailed description and examples with references made to the accompanying drawings, wherein:

DETAILED DESCRIPTION OF THE INVENTION

Figure 1:
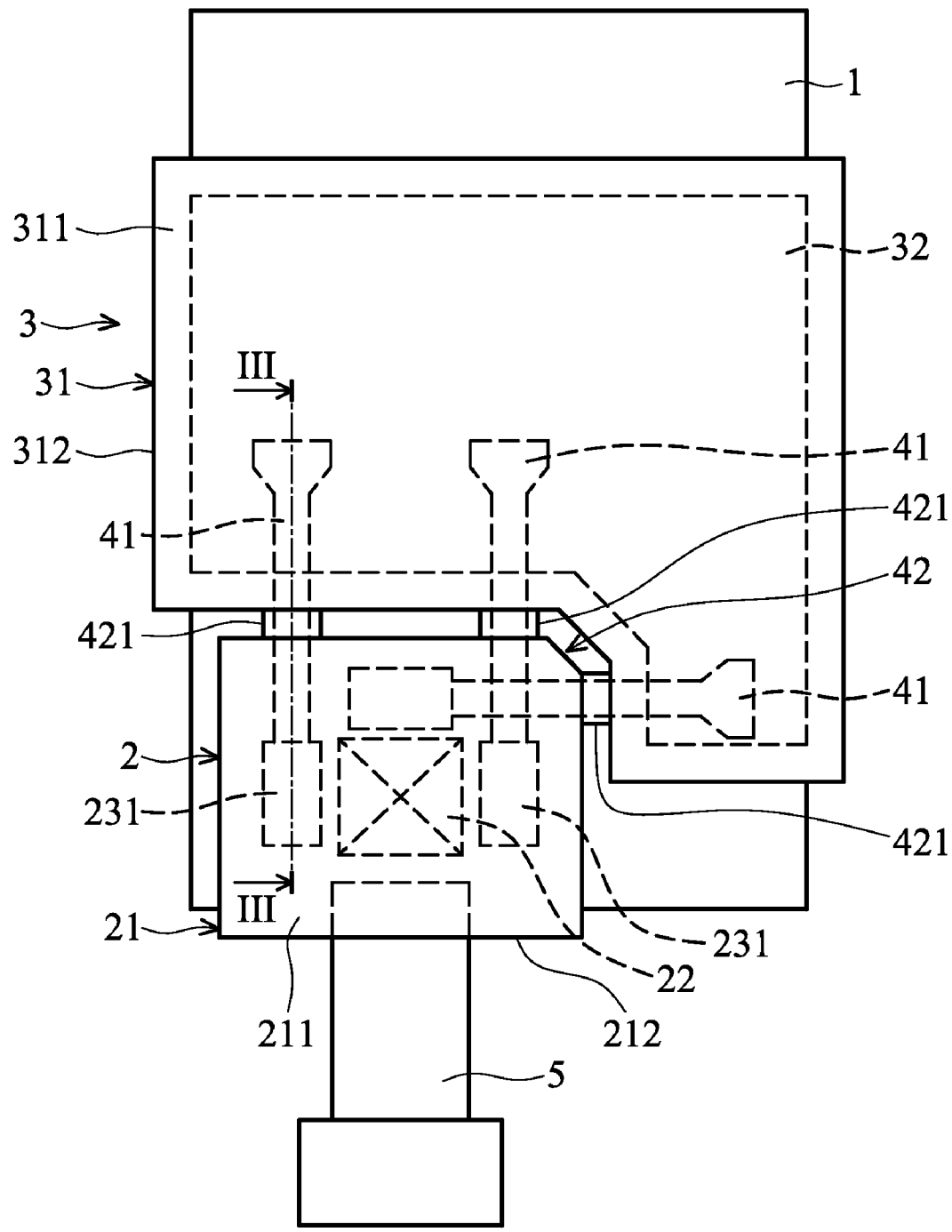
FIG. 1 is a schematic view of an embodiment of an optical engine that improves electromagnetic interference according to the invention.
Figure 2:
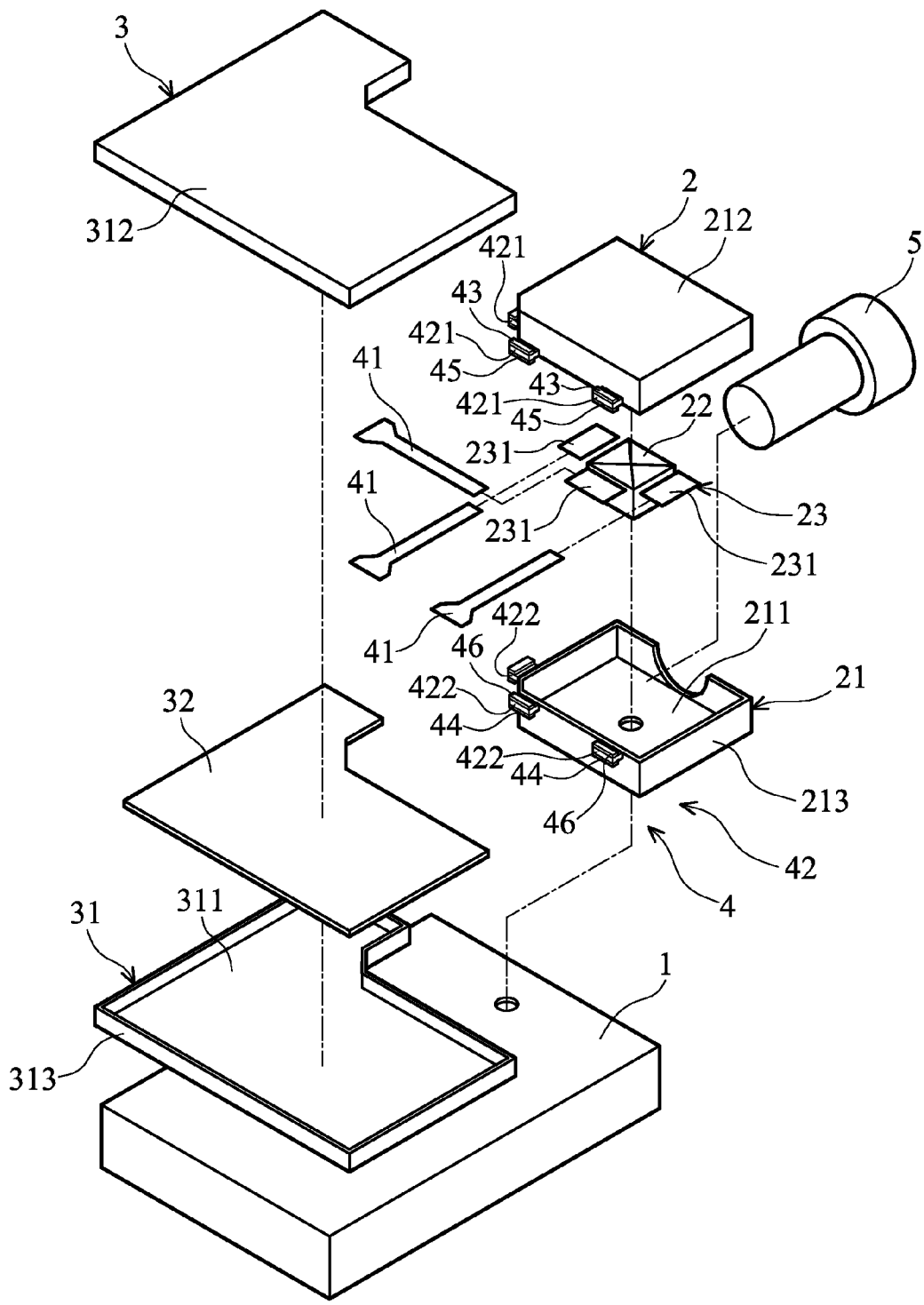
FIG. 2 is an exploded view of the embodiment in FIG. 1.
Figure 3:
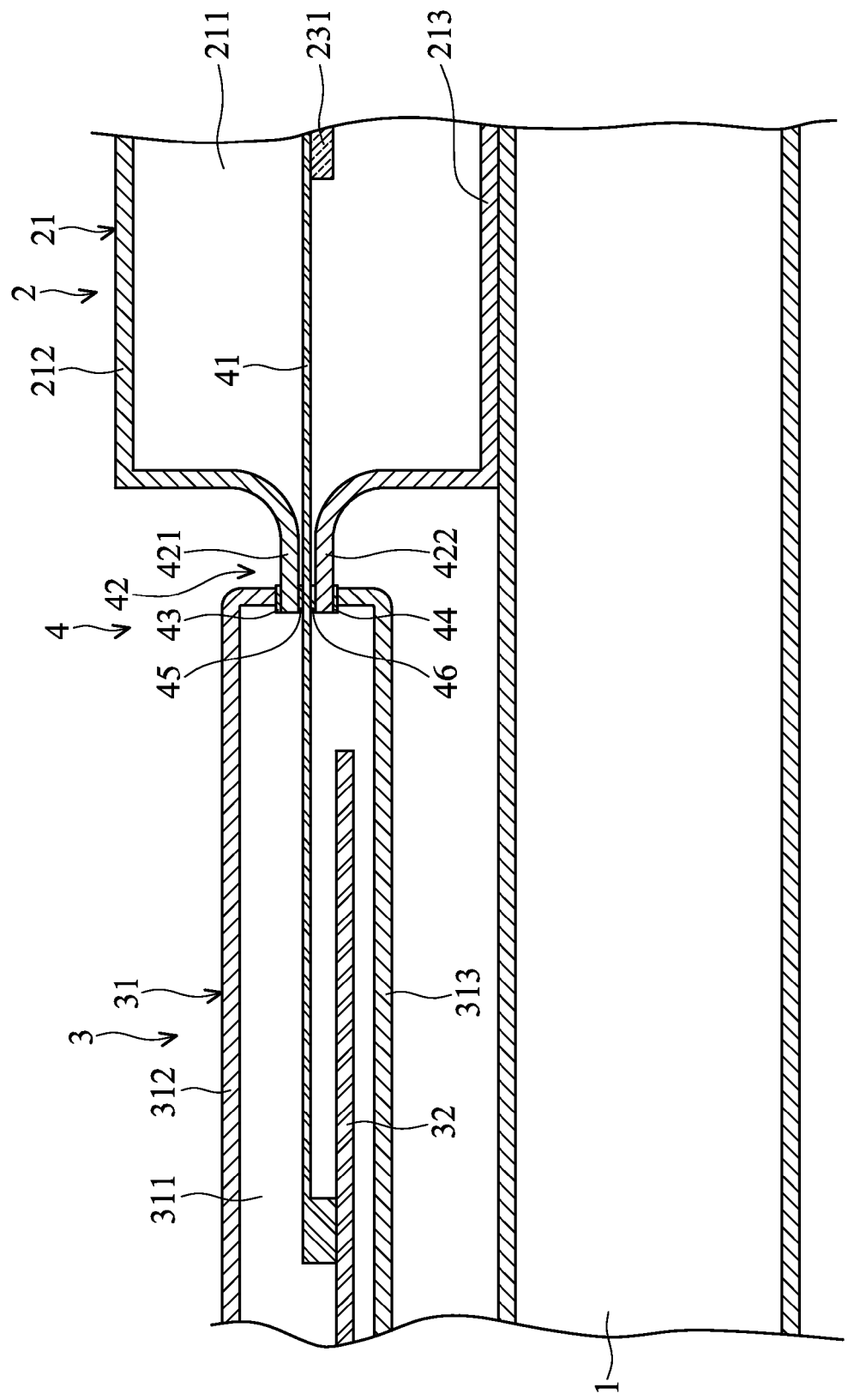
FIG. 3 is a cross-sectional view that shows a connecting unit along hatches III-III.

Referring to FIGS. 1-3, FIGS. 1-3 show an embodiment of an optical engine of the invention for improving electromagnetic interference. The optical engine comprises a light source module 1, an imaging module 2, a driver module 3, a connecting unit 4 and a lens 5.

The light source module 1 provides light for the imaging module 2 and the lens 5.

The imaging module 2 comprises an imaging housing with an imaging space 211, and a light management unit 22 and an imaging unit 23 disposed in the imaging space 211. The imaging housing 211 comprises an imaging cover 212 and an imaging bottom 213 for forming the imaging space 211. In this embodiment, the light management unit 22 may be an X-cube for splitting or combining various colored lights. The imaging unit 23 comprises three LCoS (Liquid Crystal on Silicon) displays 231 for generating images.

The driver module 3 near the imaging module 2 comprises a driver housing 31 with a driver space 311 made of a conductive material, and a driver circuit board 32 in the driver space 311 driving the imaging unit 23. The driver housing 31 comprises a driver cover 312 and a driver bottom 313 for forming the driver space 311.

The connecting unit 4 comprises three cables electrically connected to the LCoS displays 231 of the imaging unit 23 and the driver circuit board 32, respectively, and three protruding modules 42 protruding from the imaging housing 21 and contacting with the driver housing 31. Each of the protruding modules 42 comprises a first protrusion 421 protruding from the imaging cover 212 and contacting with the driver cover 312, and a second protrusion 422 protruding from the imaging bottom 213 and contacting with the driver bottom 313. The first protrusion 421 is separated from and faces to the second protrusion 422. The first protrusion 421 and the second protrusion 422 are made of a conductive material. Each of the cables 41 are installed between the first protrusion 421 and the second protrusion 422 of the protruding module 42. In this embodiment, the gaps between the first protrusions 421 and the second protrusions 422 are less than 3 mm.

One end of the lens 5 is installed in the imaging module 2 and the other end of the lens 5 protrudes out of the imaging module 2 for outputting and projecting images.

Concerning electromagnetic interference, the following describes how embodiments of the invention improve electromagnetic interference. High frequency imaging signals are transmitted from the driver circuit board 32 to the imaging unit 23 via the cables 41 for imaging, thus, a high electromagnetic wave is generated. However, in the embodiment of the invention, the first protrusions 421 and the second protrusions 422 of the protruding modules 42 are electrically connected to the imaging module 2 and the driver module 3. That is to say, the first protrusions 421 and the second protrusions 422 work as bridges to join the imaging module 2 and the driver module 3. The imaging module 2 and the driver module 3 form a close loop and conductive environment. Thus, the cables 41 electrically connected to the imaging unit 23 and the driver circuit board 32 are well shielded, whether disposed in the image imaging module 2 or the driver module 3, substantially decreasing electromagnetic wave leakage. The purpose of improvement in the leakage of the electromagnetic waves is arrived.

Note that the first protrusions 421 and the second protrusions 422 may protrude from the imaging module 2 and contact with the driver module 3. Or the first protrusions 421 and the second protrusions 422 may protrude from the driver module 3 and contact with the imaging module 2. Or the first protrusions 421 and the second protrusions 422 may respectively protrude from different modules. The above-mentioned structures all improve the leakage of the electromagnetic waves. In order to increase the electric conductivity between the first protrusions 421 and driver cover 312 and between the second protrusions 422 and driver bottom 313, the connecting unit 4 further comprises three first conductive elastic elements 43 respectively connected to the first protrusions 421 and the driver cover 312, and three second conductive elastic elements 46 respectively connected to the second protrusions 422 and the driver bottom 313, increasing the connecting efficiency and the electric conductivity between the first protrusions 421, the second protrusions 422 and the driver module 3, thus, improving shielding effect. Similarly, in order to increase the electric conductivity between the first protrusions 421 and the cables 41 and between the second protrusions 422 and the cables 41, the connecting unit 4 further comprises three third conductive elastic elements 45 respectively connected to the first protrusions 421 and the cables 41, and three fourth conductive elastic elements 46 respectively connected to the second protrusions 422 and the cables 41, increasing the connecting efficiency and the electric conductivity between the first protrusions 421, the second protrusions 422 and the cables 41, thus, also improving shielding effect.

Figure 4:
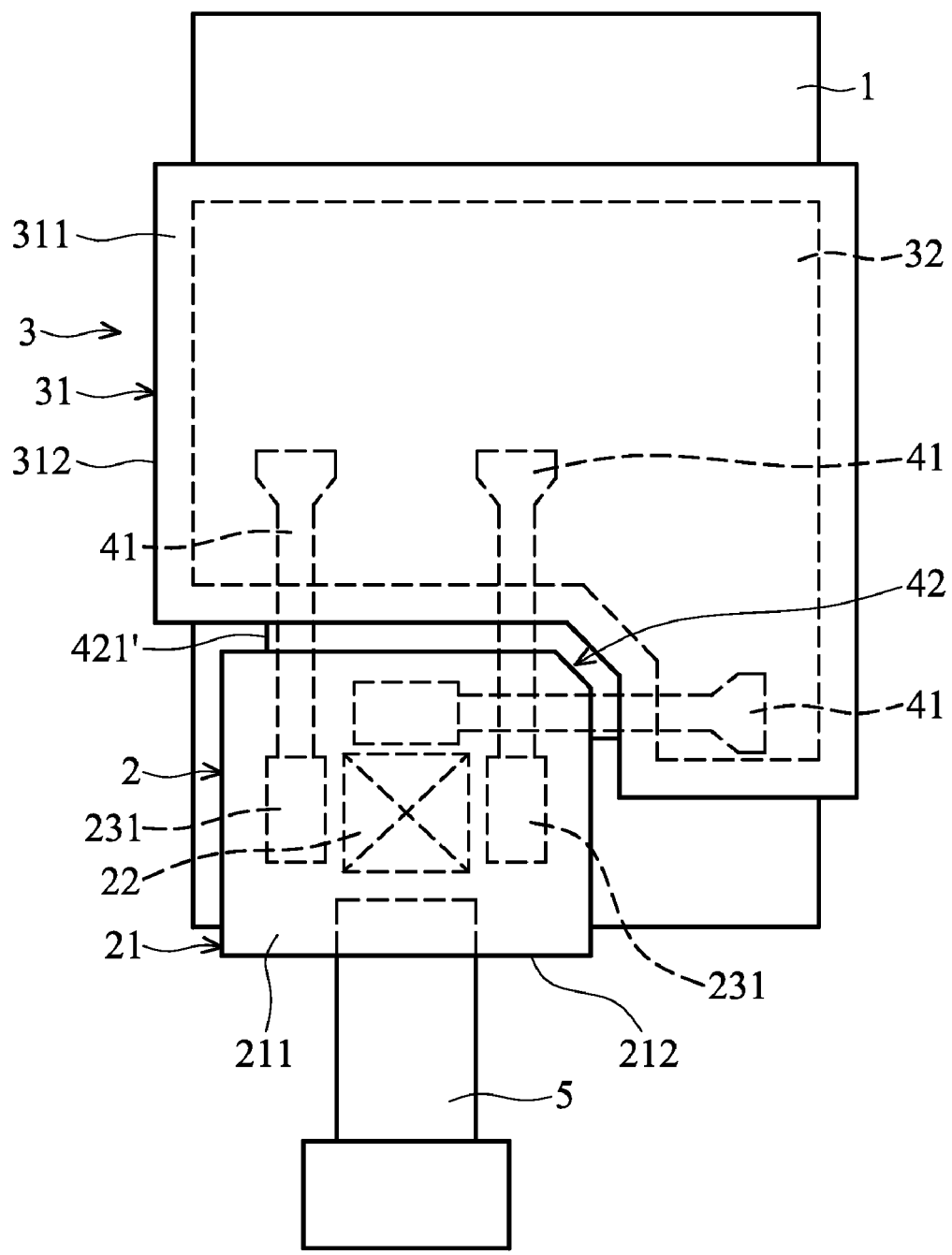
FIG. 4 is a schematic view of another embodiment of an optical engine that improves electromagnetic interference according to the invention.
Figure 5:
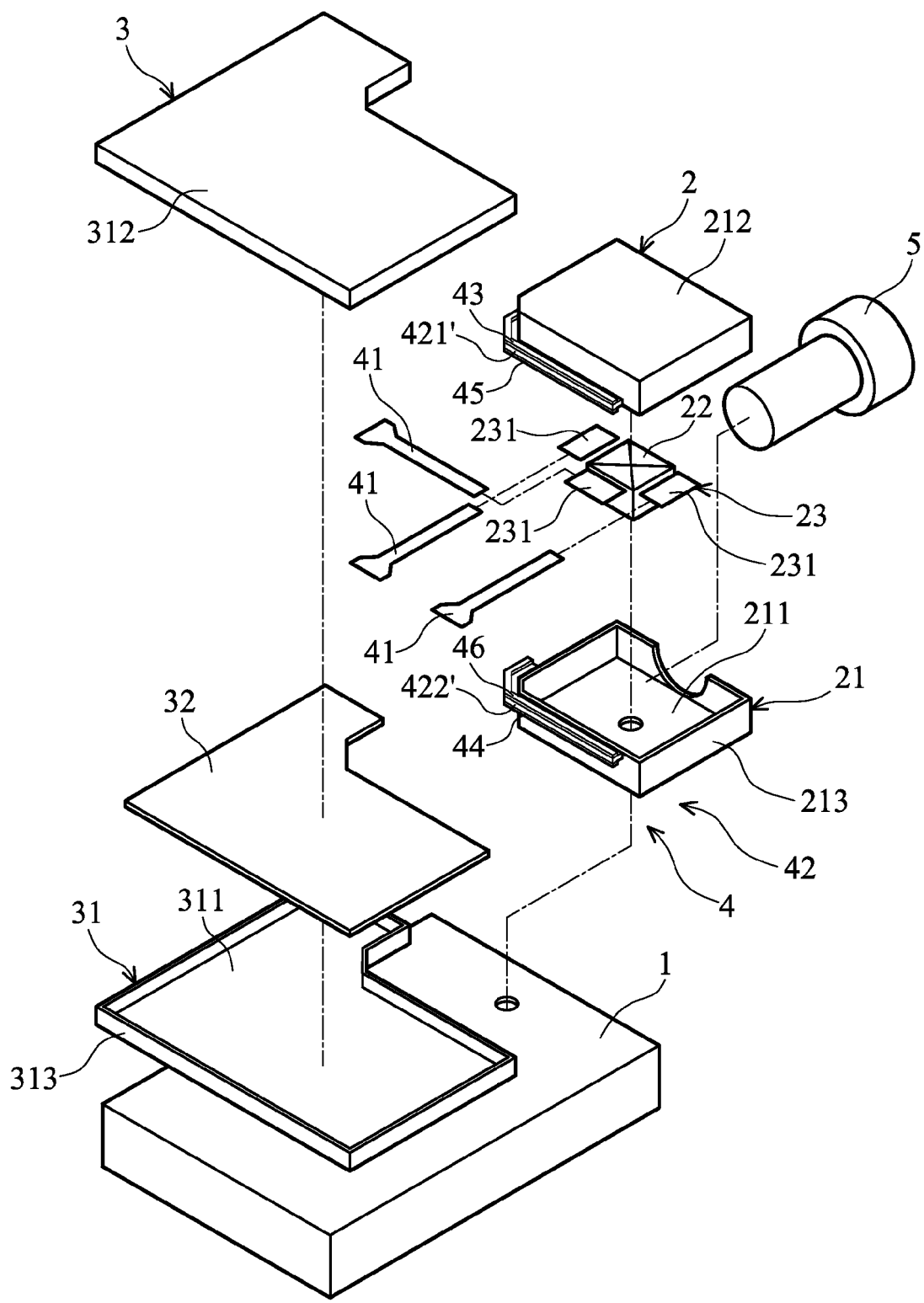
FIG. 5 is an exploded view of the embodiment in FIG. 4.

Referring to FIGS. 4 and 5, FIGS. 4 and 5 show another embodiment of the optical engine that can improve electromagnetic interference according to the invention. The difference between FIGS. 4-5 and FIGS. 1-3 is that the connecting unit 4 in this embodiment only comprises one protruding module 42 and the protruding module 42 comprises a first protrusion 421' and a second protrusion 422'. The sizes of the first protrusion 421' and the second protrusion 422' are large enough to cover the three cables 41. Namely, the first protrusion 421 and the second protrusion 422 in FIGS. 1-3 are individual. Alternatively, the first protrusion 421' and the second protrusion 422' in FIGS. 4 and 5 act like a combined first protrusion 421 and the second protrusion 422 to form a unitary and single member. The mold and the assembly process of this embodiment are simplified, thus, decreasing costs.

In summary, the above-mentioned embodiments of the optical engine of the invention improve electromagnetic interference. Advantages of the embodiments of the optical engine of the invention are as follows:

First, electromagnetic interference is improved. The imaging module 2 is electrically connected to the driver module 3 via the first protrusion 421 and the second protrusion 422 for forming a bridge between two modules 2 and 3, making the imaging module 2 and the driver module 3 forms a close loop and conductive environment via the first protrusion 421 and the second protrusion 422. The cables 41 electrically connected to the imaging unit 23 and the driver circuit board 32 are well shielded, substantially decreasing electromagnetic wave leakage, whether disposed in the imaging module 2, the driver module 3 or between the first protrusion 421 and the second protrusion 422.

Second, repair and replacement is simplified. The optical engine of the invention improving electromagnetic interference does not use a copper foil and an adhesive tape to cover the cables like a conventional projection system, but only uses the first protrusion 421 and the second protrusion 422 to form a close loop and conductive environment. Thus, when repairing, all that is required is to open the covers 212 and 312 for repair. Dismantling a copper foil and an adhesive tape is avoided, thus, simplifying repair and replacement of the optical engine.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical engine, comprising:
a light source module, providing a light beam;
an imaging module comprising:
an imaging housing with an imaging space made of a conductive material, and
an imaging unit installed in the imaging space, wherein the light beam enters the imaging unit to form an image;
a projection lens, wherein the image is transmitted into the projection lens from the imaging module to be projected;
a driver module comprising:
a driver housing with a driver space made of a conductive material, and
a driver circuit board installed in the driver space; and
a connecting unit comprising:
at least one cable is electrically connected to the imaging unit and the driver circuit board, and
at least a protruding module protruding from one of the imaging housing and the driver housing, and contacting with the other,
wherein the cable is disposed in the protruding module made of a conductive material.

2. The optical engine as claimed in claim 1, wherein the protruding module comprises a first protrusion and a second protrusion facing the first protrusion, and the cable is installed between the first protrusion and the second protrusion.

3. The optical engine as claimed in claim 2, wherein the imaging housing of the imaging module comprises an imaging cover and an imaging bottom for forming the imaging space, and the driver housing of the driver module comprises a driver cover and a driver bottom for forming the driver space.

4. The optical engine as claimed in claim 3, wherein the connecting unit further comprises a plurality of cables and a plurality of protruding modules, and each cable is disposed between the first protrusion and the second protrusion of the protruding modules.

5. The optical engine as claimed in claim 4, wherein the first protrusion protrude from the image cover and contact with the driver cover.

6. The optical engine claimed in claim 5, wherein the second protrusion protrude from the image bottom and contact with the driver bottom.

7. The optical engine claimed in claim 6, further comprising a plurality of gaps, between the first protrusion and the second protrusion, less than 3 mm.

8. The optical engine claimed in claim 7, wherein the connecting unit further comprises a plurality of first conductive elastic elements respectively connected to the first protrusion and the driver cover, and a plurality of second conductive elastic elements respectively connected to the second protrusion and the driver bottom.

9. The optical engine claimed in claim 8, wherein the connecting unit further comprises a plurality of third conductive elastic elements respectively connected to the first protrusion and the cable, and a plurality of fourth conductive elastic elements respectively connected to the second protrusion and the cable.

10. The optical engine claimed in claim 3, wherein the connecting unit further comprises a plurality of cables and protruding modules, and the cables are installed between the first protrusion and the second protrusion of the protruding modules.

11. The optical engine claimed in claim 10, wherein the first protrusion protrudes from the image cover and contacts with the driver cover.

12. The optical engine claimed in claim 11, wherein the second protrusion protrudes from the image bottom and contacts with the driver bottom.

13. The optical engine as claimed in claim 12, further comprising a gap, between the first protrusion and the second protrusion, less than 3 mm.

14. The optical engine as claimed in claim 13, wherein the connecting unit further comprises a first conductive elastic element respectively connected to the first protrusion and the driver cover, and a second conductive elastic element respectively connected to the second protrusion and the driver bottom.

15. The optical engine as claimed in claim 14, wherein the connecting unit further comprises a third conductive elastic element respectively connected to the first protrusion and the cables, and a fourth conductive elastic element respectively connected to the second protrusion and the cables.

16. The optical engine as claimed in claim 1, wherein an end of the projection lens is installed in the imaging module, and the other end of the projection lens protrudes out of the imaging module for outputting and projecting the image.

* * * * *